United States Patent
Yoshikawa

(10) Patent No.: US 10,482,416 B2
(45) Date of Patent: Nov. 19, 2019

(54) TERMINAL APPARATUS, MANAGEMENT APPARATUS, MANAGEMENT SYSTEM, AND NON-TRANSITORY COMPUTER READABLE MEDIUM

(71) Applicant: FUJI XEROX CO., LTD., Tokyo (JP)

(72) Inventor: Hayato Yoshikawa, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 626 days.

(21) Appl. No.: 15/018,120

(22) Filed: Feb. 8, 2016

(65) Prior Publication Data

US 2017/0083859 A1 Mar. 23, 2017

(30) Foreign Application Priority Data

Sep. 18, 2015 (JP) .................. 2015-184954

(51) Int. Cl.
*G06Q 10/08* (2012.01)
*G06F 3/0484* (2013.01)
*G06F 3/03* (2006.01)
*G06K 7/10* (2006.01)

(52) U.S. Cl.
CPC ....... *G06Q 10/0833* (2013.01); *G06F 3/0304* (2013.01); *G06F 3/0484* (2013.01); *G06K 7/10722* (2013.01); *G06Q 10/087* (2013.01)

(58) Field of Classification Search
CPC ............. G06Q 10/0833; G06Q 10/087; G06Q 10/083; G06Q 10/08
See application file for complete search history.

(56) References Cited

U.S. PATENT DOCUMENTS

| | | | | |
|---|---|---|---|---|
| 5,424,524 A | * | 6/1995 | Ruppert | G06K 17/00 235/383 |
| 5,965,861 A | * | 10/1999 | Addy | G01S 3/7865 186/61 |
| 2001/0018671 A1 | * | 8/2001 | Ogasawara | G06Q 10/087 705/26.8 |
| 2002/0077937 A1 | * | 6/2002 | Lyons | G06Q 10/087 705/28 |

(Continued)

FOREIGN PATENT DOCUMENTS

| | | |
|---|---|---|
| JP | 2002230474 A | 8/2002 |
| JP | 2009301118 A | 12/2009 |
| JP | 2012-38264 A | 2/2012 |

OTHER PUBLICATIONS

Hompel, M. & Schmidt, T., Automation and Organisation of Warehouse and Order Picking Systems, 2007, Springer-Verlag Berlin Heidelberg, pp. 39-43 (Year: 2007).*

(Continued)

*Primary Examiner* — Kevin H Flynn
*Assistant Examiner* — Wayne S. Murray
(74) *Attorney, Agent, or Firm* — Sughrue Mion, PLLC

(57) ABSTRACT

A terminal apparatus includes a reading unit that reads an identifier of at least one predetermined object and a display that includes a first display, which displays the identifier read by the reading unit, and a second display, which displays management information including an information item that identifies the object and an information item that indicates whether the identifier of the object has been read by the reading unit.

10 Claims, 5 Drawing Sheets

(56) References Cited

U.S. PATENT DOCUMENTS

| | | | |
|---|---|---|---|
| 2004/0128134 A1* | 7/2004 | Sacks | G10L 13/00 704/270 |
| 2010/0169000 A1* | 7/2010 | Overgoor | G01C 21/34 701/465 |
| 2013/0339122 A1* | 12/2013 | Truitt | G06Q 30/0269 705/14.26 |

OTHER PUBLICATIONS

Communication dated Feb. 3, 2016, issued by the Japan Patent Office in corresponding Japanese Application No. 2015-184954.
Office Action dated Jul. 29, 2019 in Chinese Application No. 201610099828.3.

\* cited by examiner

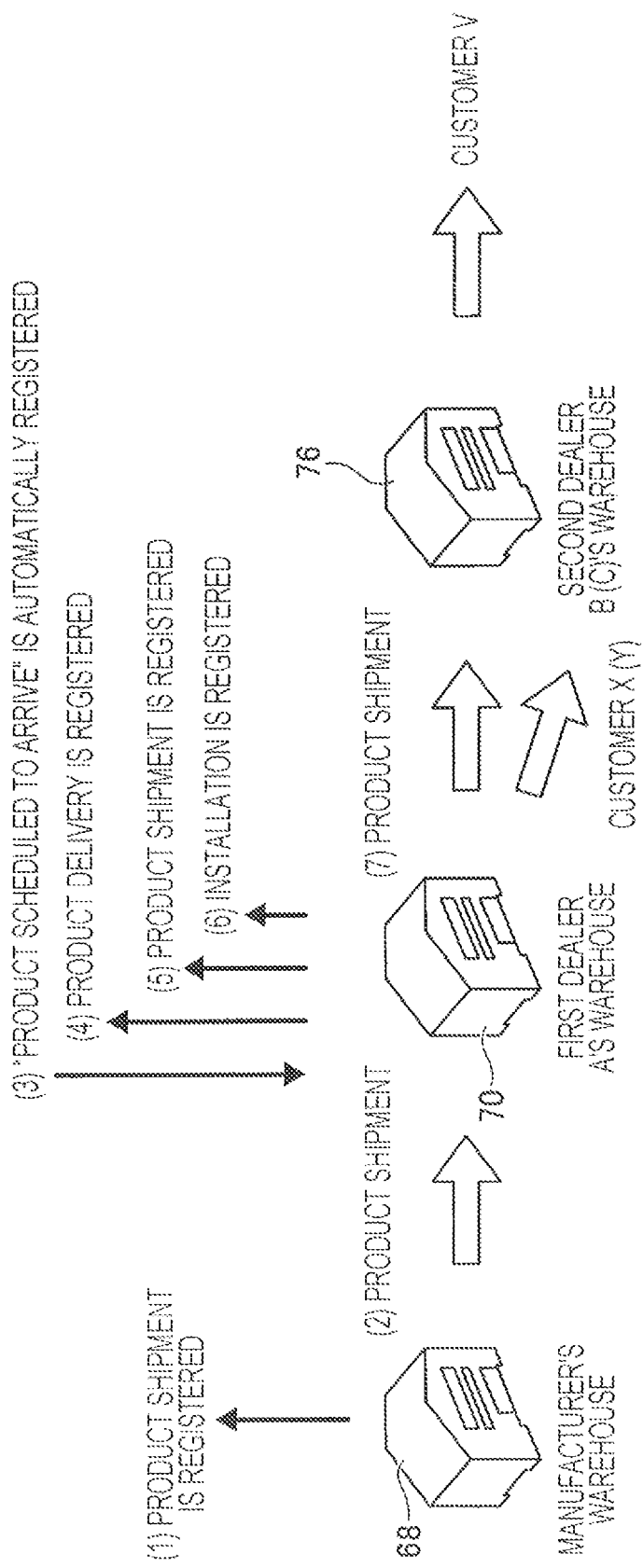

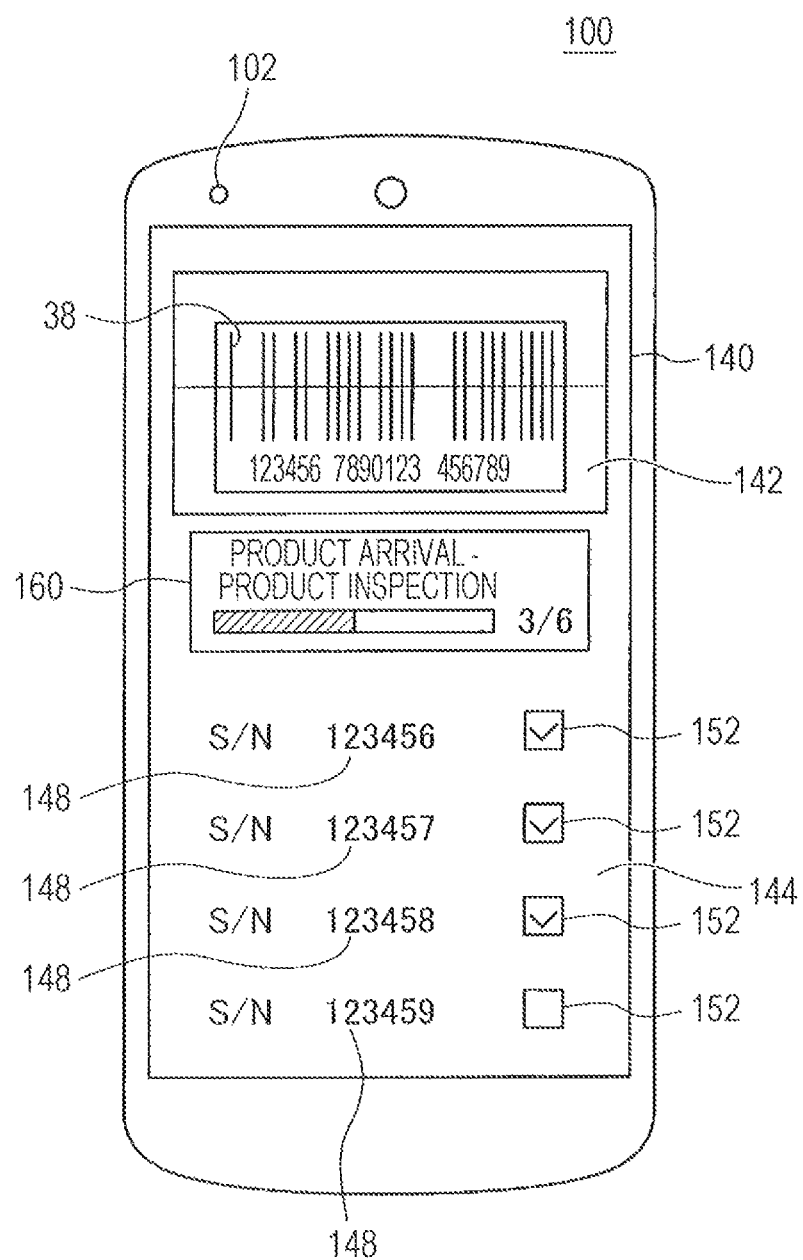

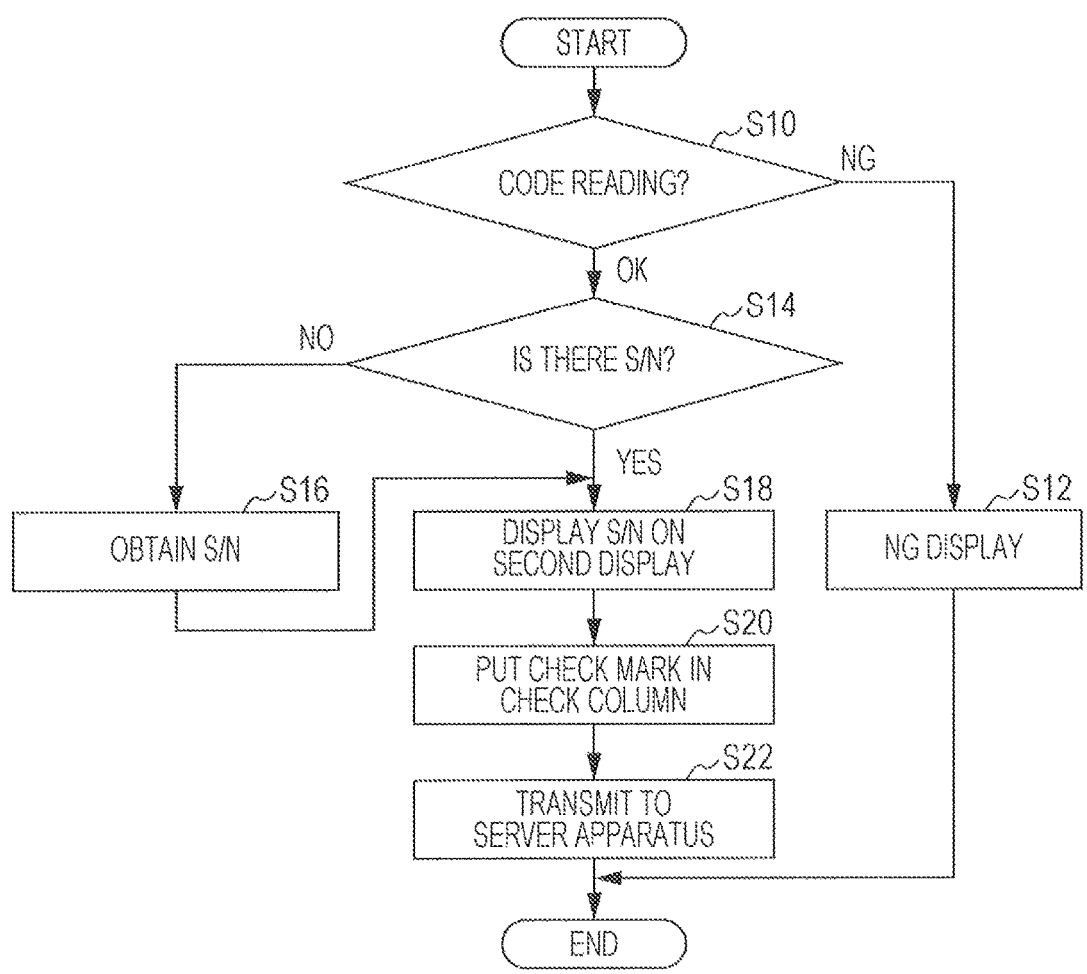

TERMINAL APPARATUS, MANAGEMENT APPARATUS, MANAGEMENT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-184954 filed Sep. 18, 2015.

BACKGROUND (i) Technical Field

The present invention relates to a terminal apparatus, a management apparatus, a management system, and a non-transitory computer readable medium.

(ii) Related Art

For example, there is a case where a product, such as a printer, is distributed in such a manner that the product is delivered from a shipper (e.g., manufacturer) to an end customer via a receiver (e.g., first dealer) and another receiver (e.g., second dealer). In such a case, the receiver and the other receiver perform product inspection, that is, the receiver and the other receiver check the quantity, type, and the like of products that have been delivered to the receiver and the other receiver.

SUMMARY

According to an aspect of the invention, there is provided a terminal apparatus including a reading unit that reads an identifier of at least one predetermined object and a display that includes a first display, which displays the identifier read by the reading unit, and a second display, which displays management information including an information item that identifies the object and an information item that indicates whether the identifier of the object has been read by the reading unit.

BRIEF DESCRIPTION OF THE DRAWINGS

An exemplary embodiment of the present invention will be described in detail based on the following figures, wherein:

FIG. 4 is a schematic diagram illustrating the flow of a product and the flow of information according to the exemplary embodiment of the present invention;

FIG. 5 is a plan view illustrating a display example of the terminal apparatus according to the exemplary embodiment of the present invention; and FIG. 6 is a flowchart illustrating inspection processing that is performed by the terminal apparatus according to the exemplary embodiment of the present invention when a product arrives.

DETAILED DESCRIPTION

An exemplary embodiment of the present invention will now be described in detail with reference to the drawings.

Figure 1:
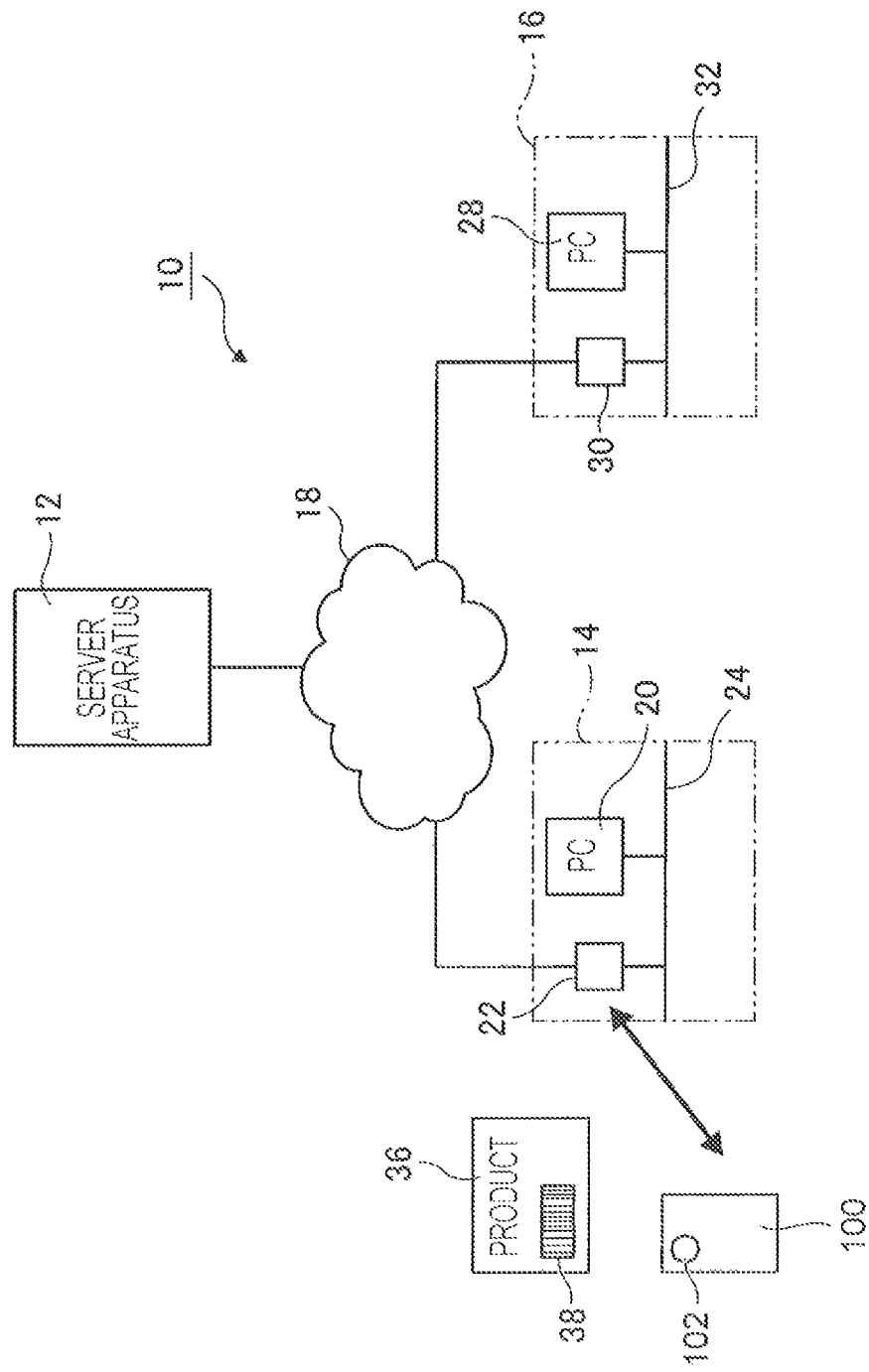
FIG. 1 is a system block diagram illustrating a management system according to an exemplary embodiment of the present invention.

FIG. 1 illustrates a management system 10 according to the exemplary embodiment of the present invention.

The management system 10 includes a server apparatus 12 of a shipper (e.g., manufacturer), and the server apparatus 12 of the shipper is connected to a local network 14 of a first receiver (e.g., first dealer A) and a local network 16 of a second receiver (e.g., second dealer B) via, for example, the Internet 18. Note that the term "shipper" refers to a natural person or a legal entity who ships a product to a natural person or a legal entity, and the terms "first receiver" and "second receiver" each refer to a natural person or a legal entity who receives a product from a natural person or a legal entity and ships the product to another natural person or another legal entity.

In the local network 14 of the first dealer A, for example, a personal computer 20 and an access point 22 are connected to each other via an internal network 24. Similarly, in the local network 16 of the second dealer B, for example, a personal computer 28 and an access point 30 are connected to each other via an internal network 32.

A terminal apparatus 100 is formed of, for example, a smartphone. The terminal apparatus 100 reads, by using a camera device 102 included in the terminal apparatus 100, codes 38 such as two-dimensional bar codes that are attached to the packages of products 36 such as, for example, printers and transmits the read data to the server apparatus 12.

Here, the terminal apparatus 100 corresponds to a terminal apparatus that is used by, for example, the first dealer A when the first dealer A performs inspection and the like of the products 36. The products 36 correspond to objects to be, for example, inspected and the like by, for example, the first dealer A or the like. The codes 38 correspond to identifiers of the products 36. The camera device 102 corresponds to a reading unit that reads the codes 38 of the products 36. Note that there are other terminal apparatuses 100 prepared for the shipper and the second receiver, and the second receiver may use the corresponding terminal apparatus 100 for inspection and the like of the products 36 as the first receiver does.

Figure 2:
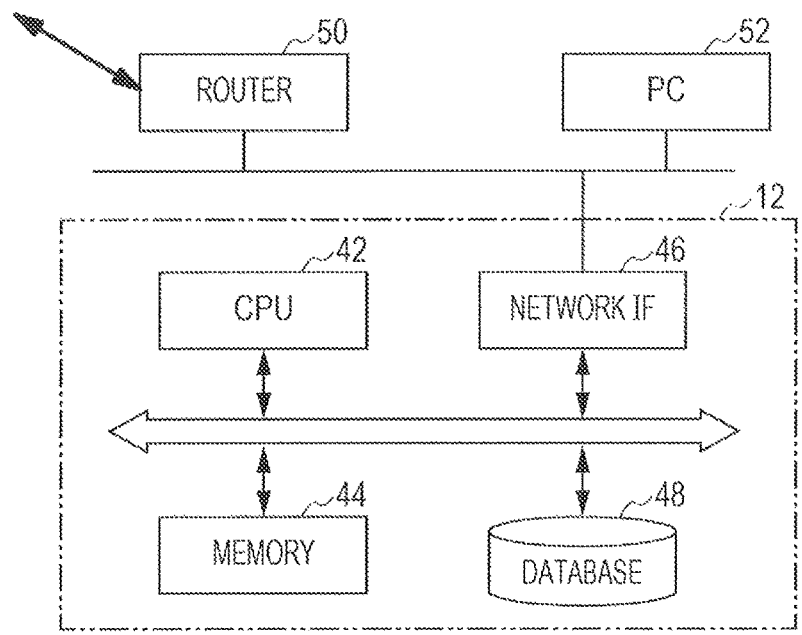
FIG. 2 is a block diagram illustrating a system configuration of a system used by a shipper according to the exemplary embodiment of the present invention.

FIG. 2 illustrates a system configuration of the manufacturer that includes the server apparatus 12.

In the server apparatus 12, a CPU 42, a memory 44, a network interface 46, and a database 48 are connected to one another via a bus or the like. The CPU 42 controls the server apparatus 12 in accordance with programs stored in the memory 44. The server apparatus 12 is connected to a router 50, which is used for connecting the server apparatus 12 to the Internet 18, and a personal computer 52 via the network interface 46. Management information items that are related to product distribution are stored in the database 48. The management information items include the names of the products 36, the serial numbers of the products 36, the locations of the products 36, the states of the products 36, customers, and problem information. The states of the products 36 include, for example, information that indicates whether the codes 38 of the products 36 have already been read by the first dealer A.

Here, the serial number of each of the products 36 is an information item that distinguishes the product 36 from the other products 36 and identifies the product 36. Information that indicates whether the codes 38 of the products 36 have already been read (images of the codes 38 of the products 36 have already been captured) by, for example, the first dealer A using the camera device 102 is included in the above-mentioned management information items, which are related to product distribution.

Figure 3:
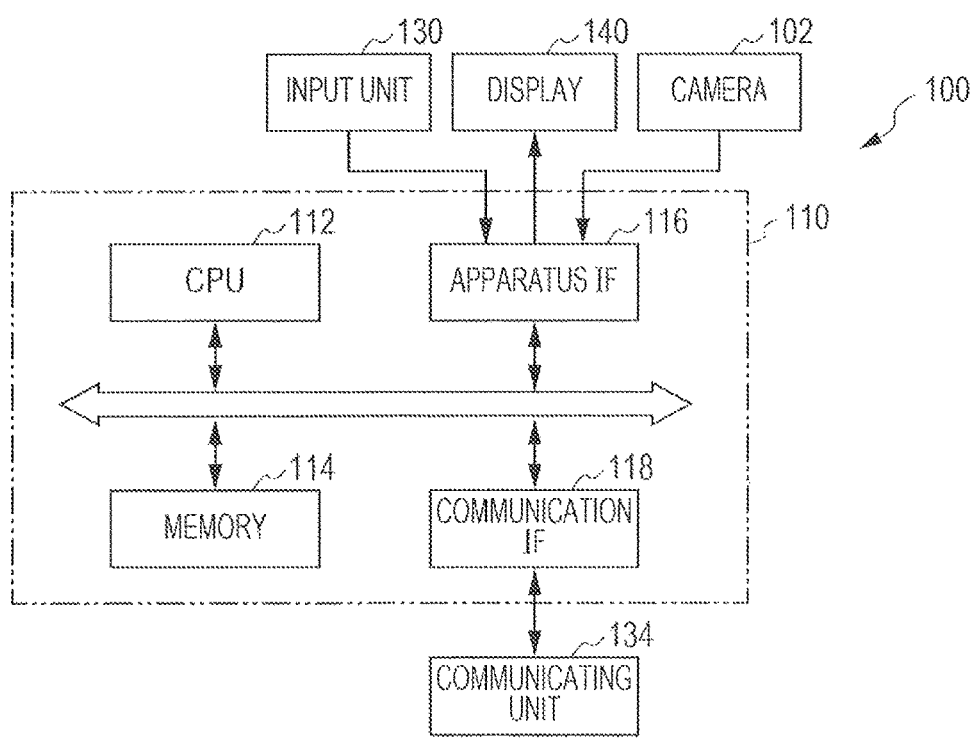
FIG. 3 is a block diagram illustrating a hardware configuration of a terminal apparatus according to the exemplary embodiment of the present invention.

FIG. 3 illustrates the hardware configuration of the terminal apparatus 100.

The terminal apparatus 100 includes a controller 110. In the controller 110, a CPU 112, a memory 114, an apparatus interface 116, and a communication interface 118 are connected to one another via a bus or the like. The CPU 112 controls the terminal apparatus 100 in accordance with programs stored in the memory 114. An input unit 130 that is formed of, for example, a touch panel, a display 140 that is formed of, for example, a liquid crystal display device, and the above-mentioned camera device 102 are connected to the apparatus interface 116. A communicating unit 134 is connected to the communication interface 118. Data read by the camera device 102 is temporarily stored in the memory 114 and then transmitted to the outside via the communicating unit 134.

FIG. 4 illustrates the flow of the products 36 and the flow of information.

In the manufacturer, a serial number is given to each product 36 in the manufacture of the products 36. The serial numbers are given directly to the products 36 (see FIG. 1), and in addition, to packing boxes of the products 36 as, for example, the codes 38, such as two-dimensional bar codes. When shipping the products 36 from a warehouse 68 of the manufacturer, as indicated by (1) in FIG. 4, by reading the codes 38 of the products 36 by using, for example, the above-described terminal apparatus 100 or the like, the products 36, whose codes 38 have been read, are determined, and information indicating that these determined products 36 are to be shipped is input. Then, the information is output to the server apparatus 12 via the Internet 18, and a data item of "product currently being shipped" is registered in the server apparatus 12. As indicated by (2) in FIG. 4, the products 36 are shipped to the first dealer A from the manufacturer's warehouse 68.

Next, in the case where the data item of "product currently being shipped" has been registered in the manufacturer, a data item of "product scheduled to arrive" is automatically registered in the first dealer A as indicated by (3) in FIG. 4. In other words, in the server apparatus 12, the data item of "product currently being shipped" that has been registered in the manufacturer is automatically converted into the data item of "product scheduled to arrive" in the first dealer A, and the data item of "product scheduled to arrive" is displayed in the first dealer A. In this manner, a display content varies with the standpoints of the manufacturer and the first dealer A.

The first dealer A registers information indicating that the products 36 have been delivered to the first dealer A. This operation is performed by inspecting the products 36 that have been actually delivered, and the inspection is performed by reading the codes 38 of the products 36 by using the corresponding terminal apparatus 100. The products 36, whose codes 38 have been read, are stored in a warehouse 70 of the first dealer A. For example, the inspection of the products 36, that is, the operation of reading the codes 38 of the products 36 takes a wide variety of forms and, for example, an operator checks a large number of products 36 one by one. Thus, it is desirable that the terminal apparatus 100, which is used for reading the codes 38, be capable of improving the efficiency of the operation of reading the codes 38.

FIG. 5 illustrates the terminal apparatus 100.

As illustrated in FIG. 5, the terminal apparatus 100 includes the above-mentioned display 140, and the display 140 includes a first display 142 and a second display 144. The code 38 of one of the products 36 that has been read by the camera device 102 (that has undergone image capturing performed by the camera device 102) is displayed on the first display 142, and the management information items of the products 36 that are scheduled to arrive, that is, that are to be inspected by the first dealer A is displayed on the second display 144. The information of the code 38 displayed on the first display 142 is transmitted to the server apparatus 12.

The management information items of the products 36 that are displayed on the second display 144 include at least serial numbers 148 of the products 36 and check columns 152. Each of the serial numbers 148 and each of the check columns 152 are displayed alongside a corresponding one of the products 36. More specifically, each of the check columns 152 is displayed on the right side of one of the serial numbers 148 of the products 36.

As described above, each of the serial numbers 148 is an information item that distinguishes the corresponding product 36 from the other products 36 and identifies the product 36. Each of the check columns 152 is an information item that indicates whether the code 38 of the corresponding product 36, which is identified by the corresponding serial number 148, has already been read by the camera device 102. In other words, the check columns 152 indicate whether inspection of the products 36 has been completed, that is, an operation of reading the codes 38 of the products 36 has been completed by, for example, the first dealer A.

In the example illustrated in FIG. 5, the product 36 corresponding to the serial number 148 of "123456" and to one of the check columns 152 that has been checkmarked, the product 36 corresponding to the serial number 148 of "123457" and to one of the check columns 152 that has been checkmarked, and the product 36 corresponding to the serial number 148 of "123458" and to one of the check columns 152 that has been checkmarked, are the products 36 whose codes 38 have undergone image capturing performed by the camera device 102, that is, the products 36 that have been inspected. On the other hand, the product 36 corresponding to the serial number 148 of "123459" and to one of the check columns 152 that has not been checkmarked is the product 36 whose code 38 has not undergone image capturing performed by the camera device 102, that is, the product 36 that has not yet been inspected.

Among the management information items of the products 36 that are to be inspected, the management information items of a predetermined number or lower of the products 36 are displayed on the second display 144. More specifically, in the example illustrated in FIG. 5, among six products 36 that are to be inspected, the management information items of a predetermined number, which is four, or lower of the products 36 are displayed. Regarding the two products 36 whose management information items are not displayed on the second display 144 among the six products 36 that are to be inspected, the management information items of the two products 36 will be displayed on the second display 144 as a result of operating the second display 144, or more specifically, by scrolling the second display 144.

Here, a product group including the above-mentioned six products 36, which are to be inspected, is, for example, a group of products that are to be delivered to the first dealer A within a predetermined period of time and is, for example, a group of products that are to be delivered to the first dealer A within one particular business day.

The display 140 further includes a third display 160. The third display 160 displays the number of products 36 that are to be delivered (scheduled to arrive) within a predetermined period of time and the number of products 36 that are to be delivered within a predetermined period of time and that have undergone image capturing performed by the camera device 102, that is, the number of products 36 that have been inspected. In the example illustrated in FIG. 5, the third display 160 shows that the number of products 36 that are to be delivered within a predetermined period of time is six, and that three of the six products 36 have been inspected.

FIG. 6 illustrates the operation of the terminal apparatus 100.

First, as illustrated in FIG. 6, it is determined whether the code 38 of one of the products 36 has been read by the camera device 102 in step S10. In the case where the code 38 has not been read, the process proceeds to step S12, and a display indicating that the code 38 has not been read, that is, an NG display is shown. Then, the process is terminated. On the other hand, in the case where the code 38 has been read in step S10, the process proceeds to step S14.

An example of the case where the code 38 has not been read in step S10 is that of a code read by the camera device 102 being different from a predetermined code format. More specifically, an example of such a case is that an image of a code having, for example, an 18 or less digit number or a 20 or more digit number is captured, when a predetermined format of the codes 38 is a 19-digit number (see the codes 38 illustrated in FIG. 5).

Other examples of the case where the code 38 has not been read in step S10 include a case where the distance from the camera device 102 to the code 38 is too large, a case where the distance from the camera device 102 to the code 38 is too small, and a case where it is difficult to read the code 38 by the camera device 102 due to lack of the surrounding brightness of the product 36 and the like. In step S12, the display indicating that the code 38 has not been read may be shown on, for example, at least one of the first display 142 and the second display 144.

In step S14, it is determined whether the serial number 148, which serves as the code 38, belongs to a group of the products 36 that have been sent out from the manufacturer's warehouse 68 in such a manner as to be delivered to the first dealer A within a predetermined period of time. In the case where it is determined that the serial number 148 does not belong to the above group, the process proceeds to step S16, and the serial number 148 is obtained from the server apparatus 12. An example of the case where it is determined that the serial number 148 does not belong to the above group includes a case where the product 36 has been sent out to the first dealer A even though the product 36 had not been scheduled to be delivered to the first dealer A within a predetermined period of time.

When obtaining the serial number 148 in step S16, instead of obtaining the serial numbers 148 of all the products 36 whose serial numbers 148 have been determined not to belong to the group of products 36 that have been sent out from the manufacturer's warehouse 68 in such a manner as to be delivered to the first dealer A within a predetermined period of time, it is desirable to obtain only the serial numbers 148 of the products 36 whose serial numbers 148 have been determined not to belong to the group of products 36 that have been sent out from the manufacturer's warehouse 68 in such a manner as to be delivered to the first dealer A within a predetermined period of time and whose serial numbers 148 belong to a group of the products 36 that are scheduled to be delivered to the first dealer A within a period of time other than the predetermined period of time.

In this case, regarding the products 36 whose serial numbers 148 do not belong to the group of products 36 that have been sent out in such a manner as to be delivered to the first dealer A within the predetermined period of time and that are not scheduled to be delivered to the first dealer A within a period of time other than the predetermined period of time, instead of obtaining the serial numbers 148, it is desirable that, for example, the second display 144 show a display indicating that the products 36 are not scheduled to be delivered to the first dealer A.

After the serial number 148 has been obtained in step S16, the process proceeds to step S18, and the display of the second display 144 is changed in such a manner that the serial number 148 of the product 36, whose serial number 148 has been obtained in step S16, is displayed on the second display 144.

In addition, in step S16, in the case where the serial number 148 of one of the products 36 whose serial number 148 has been determined in step S14 to belong to the above group is not displayed on the second display 144, that is, in the case where the serial number 148 of the product 36 that has been determined to belong to the above group is not displayed on the second display 144 unless the second display 144 is scrolled, the display of the second display 144 is changed in such a manner that the serial number 148 of the product 36 that has been determined to belong to the above group is displayed on the second display 144 without scrolling the second display 144.

When the serial number 148 of the product 36 is displayed on the second display 144 in step S18, in order to indicate that the corresponding code 38 has been read by the camera device 102, it is desirable to cause at least one of the first display 142 and the second display 144 to blink or the like to display information indicating that the corresponding code 38 has been read.

Then, the process proceeds to step S20, and in step S20, the check column 152 of the product 36 whose serial number 148 is displayed on the second display 144 in step S18 is checkmarked, and the check column 152 of the product 36 whose serial number 148 has been determined in step S14 to belong to the above-mentioned group is checkmarked. Here, it is desirable that the display of the serial number 148 in step S18 and the operation of checkmarking the check columns 152 in step S20 be simultaneously performed. In the next step S22, information indicating that the product-arrival processing has been completed is transmitted to the server apparatus 12, and the process is terminated.

Returning to FIG. 4, regarding the products 36 that have been delivered to the first dealer A, the serial numbers 148 of the products 36 are transmitted to the server apparatus 12, and a data item of, for example, "warehouse" is registered. The products 36 are stored in the warehouse 70 of the first dealer A.

There are a case where the first dealer A ships the products 36 to the second dealer B (and another second dealer C) and a case where the first dealer A ships the products 36 to a customer X (and another customer Y). In the case where the first dealer A ships the products 36 to the second dealer B, as indicated by (5) in FIG. 4, information indicating that the products 36 are to be shipped to the second dealer B is input by reading the codes 38 of the products 36 by using the corresponding terminal apparatus 100. In addition, the information is output to the server apparatus 12 via the Internet 18, and a data item of "product currently being shipped to company B" is registered in the server apparatus 12. As indicated by (7) in FIG. 4, the products 36 are shipped from the warehouse 70 of the first dealer A to the second dealer B.

In the case where the products 36 are shipped from the first dealer A to the customer X, as indicated by (6) in FIG. 4, installation information is registered as an installation report after the products 36 have been installed. The installation information includes the names of the products 36 that are installed, the serial numbers of the products 36, a customer name, an installation date, and information regarding a trouble having occurred during the product installation.

Although, in the above-described exemplary embodiment, the management information items of the products 36 are managed by the server apparatus 12 of the manufacturer, the present invention is not limited to this, and the management information items of the products 36 may be managed by any management apparatus that is connected to the Internet or the like.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal apparatus comprising:
a camera device configured to read an identifier of an object from among a plurality of objects; and
a display comprising a first display and a second display, the first display being configured to display the identifier read by the camera device, the second display being configured to display a plurality of records at once that are associated with the plurality of objects, the plurality of records including information items that identify the plurality of objects and information items that indicate whether respective identifiers of the plurality of objects have been read by the camera device; and
a controller configured to receive, from a management apparatus, a list of records associated with objects from among the plurality of objects that are scheduled to be delivered within a predetermined time,
wherein the second display is configured to display a predetermined number of records included in the list of records at once, and
wherein, in response to the object being associated with a record included in the list of records that is not displayed by the second display, the second display is adjusted to display the record.

2. The terminal apparatus according to claim 1,
wherein, in response to one of the objects whose identifier has been read by the camera device not being scheduled to be delivered within a predetermined period of time and being scheduled to be delivered within a period of time other than the predetermined period of time, the second display switches the display screen of the second display in such a manner that the management information regarding the object whose identifier has been read by the camera device is displayed on the second display.

3. The terminal apparatus according to claim 1,
wherein, in response to a format of the identifier, which is read by the camera device, being different from a predetermined format, information indicating that it is difficult to read the identifier is displayed on at least one of the first display and the second display.

4. The terminal apparatus according to claim 1,
wherein, in response to an operation of reading the identifier being completed by the camera device, information indicating that the operation has been completed is displayed on at least one of the first display and the second display.

5. The terminal apparatus according to claim 1,
wherein the display further comprises a third display configured to display the number of objects that are scheduled to be delivered within the predetermined time and the number of objects that are scheduled to be delivered within the predetermined time and whose identifiers have been read by the reading unit.

6. The terminal apparatus according to claim 1,
wherein, in response to the camera device reading an identifier of a second object from among the plurality of objects that is associated with a second record that is not included in the list of records and in response to the terminal apparatus determining that the second object is scheduled to be delivered at a time other than within the predetermined time, the second display is adjusted to display the second record.

7. The terminal apparatus according to claim 1,
wherein, in response to the camera device reading an identifier of a second object from among the plurality of objects that is associated with a second record that is not included in the list of records and in response to the terminal apparatus determining that the second object is not scheduled to be delivered, the second display is adjusted to indicate that the second object is not scheduled to be delivered.

8. The terminal apparatus according to claim 6,
wherein, in response to the camera device reading an identifier of a third object from among the plurality of objects that is associated with a third record that is not included in the list of records and in response to the terminal apparatus determining that the third object is not scheduled to be delivered, the second display is adjusted to indicate that the third object is not scheduled to be delivered.

9. A management system that manages management information regarding an object from among a plurality of objects, the management system comprising:
a management apparatus comprising a controller; and
a terminal apparatus comprising a first display and a second display, the first display being configured to display an identifier of the object read by a camera device, the second display being configured to display a plurality of records at once that are associated with the plurality of objects, the plurality of records including information items that identify the plurality of objects and information items that indicate whether respective identifiers of the plurality of objects have been read by the camera device,
wherein the controller is configured to transmit, to the terminal apparatus, a list of records associated with objects from among the plurality of objects that are scheduled to be delivered within a predetermined time,
wherein the second display is configured to display a predetermined number of records included in the list of records at once, and
wherein, in response to the object being associated with a record included in the list of records that is not displayed by the second display, the second display is adjusted to display the record.

10. A non-transitory computer readable medium storing a program causing a computer to perform a process, the process comprising:
- managing information regarding an object from among a plurality of objects;
- displaying a plurality of records at once that are associated with an object from among the plurality of objects on a second display of a terminal apparatus that includes a display, the display including a first display and the second display, the first display being configured to display an identifier of the object read by a camera device, the plurality of records including information items that identify the plurality of objects and information items that indicate whether respective identifiers of the plurality of objects have been read by the camera device;
- receiving a list of records associated with objects from among the plurality of objects that are scheduled to be delivered within a predetermined time;
- displaying, on the second display, a predetermined number of records included in the list of records at once; and
- in response to the object being associated with a record included in the list of records that is not displayed by the second display, adjusting the second display to display the record.

* * * * *